2,991,266
MIXTURES OF DIORGANOPOLYSILOXANES, LIQUID CYANOALKYLPOLYSILOXANES AND SILICA FILLER
Ben A. Bluestein and Joseph C. Caprino, Schenectady, N.Y., assignors to General Electric Company, a corporation of New York
No Drawing. Filed May 21, 1958, Ser. No. 736,674
18 Claims. (Cl. 260—37)

This invention is concerned with organopolysiloxanes convertible by heat, and which in the cured, solid, elastic state have improved physical properties. More particularly the invention relates to a mixture of ingredients comprising (1) an organopolysiloxane convertible to the cured, solid, elastic state in which the organic groups are selected from the class consisting of monovalent hydrocarbon radicals and halogenated aryl radicals, there being present from 1.98 to 2.05 organic groups per silicon atom, and (2) from 1 to 20%, by weight, based on the weight of (1), of an organopolysiloxane containing a nitrile (—CN) radical attached to silicon through aliphatic carbon, the remaining valences of the silicon, other than the valences which make up the siloxane chain, being satisfied by a member selected from the class consisting of alkyl radicals, aryl radicals, aralkyl radicals, alkaryl radicals and mixtures of said radicals.

Organopolysiloxanes convertible by heat to the cured, solid, elastic state (also known as "silicone rubbers") have found eminent use in applications requiring resistance to elevated temperatures of the order of from about 125–175° C. or higher for extended periods of time. In order to improve the physical properties, for instance, tensile strength, elongation, and tear strength, of such polymeric materials, various reinforcing agents and fillers have been incorporated for this purpose. However, much has been left to be desired in the improvement of physical properties despite the use of such reinforcing fillers; it has been the objective in the silicone rubber art to improve the properties of cured silicone rubber to a point which approaches, and if possible, exceeds the physical properties of other synthetic and natural rubbers including, for instance, butadiene-styrene rubbers, butadiene-acrylonitrile rubbers, etc.

We have now discovered that we can obtain cured, solid, elastic organopolysiloxanes having improved physical properties over cured organopolysiloxanes heretofore known by incorporating in such convertible organopolysiloxanes (in addition to the usual fillers) prior to heat curing or vulcanization thereof, a minor proportion, preferably less than 20%, by weight, based on the weight of the organopolysiloxane, of the aforesaid organopolysiloxane containing a nitrile radical attached to silicon through aliphatic carbon, the remaining valences of silicon, other than the valences which make up the siloxane chain, being satisfied by a member selected from the class consisting of alkyl radicals, aryl radicals, aralkyl radicals, alkaryl radicals and mixtures of said radicals. Such organopolysiloxane containing a nitrile radical will hereinafter for brevity be referred to as "cyanoalkylpolysiloxane."

The proportion of the cyanoalkylpolysiloxane used is advantageously varied within certain limits. Generally, significant improvements in physical properties of the cured convertible organopolysiloxanes are obtained when as low as 1%, by weight, of the cyanoalkylpolysiloxane is employed, based on the weight of the convertible organopolysiloxane, (that is exclusive of the filler, curing agent, or other modifying agents present therein). Generally, we prefer to employ from about 1 to 20%, by weight, of the cyanoalkylpolysiloxane based on the weight of the convertible organopolysiloxane.

The convertible silicone compositions herein described, which may be highly viscous masses or gummy, elastic solids, depending on the state of condensation, the condensing agent employed, the starting organopolysiloxane used to make convertible organopolysiloxanes, etc., will hereinafter be referred to as "convertible organopolysiloxane" or more specifically as "convertible methylpolysiloxane" and "convertible methyl phenylpolysiloxane."

Although convertible organopolysiloxanes with which the present invention is concerned are well known, for purposes of showing persons skilled in the art the various convertible organopolysiloxanes which may be employed in the practice of the present invention, and methods for preparing the same, attention is directed to the convertible organopolysiloxanes disclosed and claimed in Marsden Patent 2,445,794 issued July 27, 1948; Agens Patent 2,448,756 and Sprung et al. Patent 2,448,556, both issued September 7, 1958; Sprung Patent 2,484,595 issued October 11, 1949; Hyde Patent 2,490,357 issued December 6, 1949; Marsden Patent 2,521,528 issued September 5, 1950; and Warrick Patent 2,541,137 issued February 13, 1951.

It will of course be understood by those skilled in the art that other convertible organopolysiloxanes containing the same or different silicon-bonded organic, for instance, hydrocarbon substituents (e.g., methyl, ethyl, propyl, vinyl, allyl, phenyl, tolyl, xylyl, benzyl, phenylethyl, naphthyl, etc.); halogenated aryl (e.g., chlorophenyl, tetrachlorophenyl, difluoronaphthyl, etc.); both alkyl and aryl (e.g., methyl and phenyl, etc.) radicals connected to silicon atoms by carbon-silicon linkages, may be employed without departing from the scope of the invention. Other mixtures of organic radicals, such as methyl, phenyl and vinyl radicals, are not precluded.

The particular convertible organopolysiloxane used is not critical and may be any one of those described in the foregoing patents, which are generally obtained by condensation of an organopolysiloxane (or mixture of organopolysiloxanes) containing an average of from about 1.95, preferably from about 1.98 to about 2.1 organic groups per silicon atom. The usual condensing agents which may be employed and which are well known in the art may include, for instance, ferric chloride hexahydrate, alkaline condensing agents, such as potassium hydroxide, cesium hydroxide, etc. These convertible organopolysiloxanes, which generally comprise polymeric diorganosiloxanes, are advantageously prepared from starting liquid organopolysiloxanes which contain about 1.99 to 2.01, inclusive, organic groups, for example, methyl groups, per silicon atom, and where at least 75 percent of the silicon atoms in the polysiloxane contain two silicon-bonded alkyl (preferably lower alkyl) groups.

The starting organopolysiloxanes used to make the convertible organopolysiloxanes by condensation thereof preferably comprise organic substituents consisting essentially of monovalent organic radicals attached to silicon through carbon-silicon linkages, there being on the average between 1.98 to 2.1 organic radicals per silicon atom, and in which the siloxane units consist primarily of units of the structural formula $R_2SiO$, where R is preferably a radical of the group consisting of methyl and phenyl radicals. At least 75 percent of the total number of R groups are preferably methyl radicals. The presence of up to 2 mol percent (e.g., from 0.05 to 0.6 mol percent) silicon-bonded vinyl radicals is not precluded and these may be present in the convertible organopolysiloxane up to 0.5 mol percent copolymerized triorganosiloxy units, e.g., trimethylsiloxy units, or terminal silicon-bonded hydroxy groups as chain-stoppers for control purposes. The polysiloxane may be one in which all the siloxane units are $(CH_3)_2SiO$, or the siloxane may be a copolymer of dimethylsiloxane and a minor amount (e.g., from 1 to 25 or more mol percent) of any of the following units alone or in combination therewith:

$$C_6H_5(CH_3)SiO \text{ and } (C_6H_5)_2SiO$$

A small amount of cure accelerator, for instance, benzoyl peroxide, tertiary butyl perbenzoate, ditertiary butyl peroxide, bis-(2,4-dichlorobenzoyl) peroxide, etc., may be incorporated in the convertible organopolysiloxane for the purpose of accelerating the cure, as is more particularly described in various patents mentioned above. The amount of curing agent used may be varied widely, for example, from about 0.1 to about 8 percent or more, preferably from about 0.75 to 6 percent, by weight, based on the weight of the convertible organopolysiloxane.

The term "cyanoalkyl polysiloxanes" as used in this application refers to organosilicon compounds having a siloxane chain with at least one cyanoalkyl radical attached to silicon with the remaining valences of the silicon atoms, other than the valences which make up the siloxane chain, being satisfied by members of the class consisting of alkyl radicals, aryl radicals, aralkyl radicals, and alkaryl radicals.

The term "cyanoalkyl radical" refers to radicals of the formula:

(1)
$$-(CH_2)_m-\overset{\displaystyle CN}{\underset{\displaystyle |}{C}}H-R$$

where R is hydrogen or an alkyl radical, e.g., methyl, ethyl, propyl, butyl, etc., and $m$ is a whole number equal to from zero to 5, inclusive, and preferably is equal to from zero to 3, inclusive.

The cyanoalkyl polysiloxanes used in the present invention include disiloxanes of the formula (2)
$$R'-\underset{\underset{R'}{|}}{\overset{\overset{R'}{|}}{Si}}-O-\underset{\underset{R'}{|}}{\overset{\overset{R'}{|}}{Si}}-(CH_2)_m-\overset{\overset{CN}{|}}{C}H-R$$

where R and $m$ are as defined above and the various R' radicals are the same or different members selected from the class consisting of alkyl radicals as defined for R; aryl radicals, e.g., phenyl, naphthyl, diphenyl, etc., radicals; halogenated aryl radicals, e.g., chlorophenyl, etc., radicals; aralkyl radicals, e.g., benzyl, phenylethyl, etc., radicals; alkaryl radicals, e.g., tolyl, xylyl, etc., radicals; cycloaliphatic radicals, e.g., cyclopentane, cyclohexane, etc., radicals; and $$-(CH_2)_m-\overset{\overset{CN}{|}}{C}H-R$$

radicals, where R has the meaning given above. Preferably, only one of the R' radicals is the $$-(CH_2)_m-\overset{\overset{CN}{|}}{C}H-R$$

radical. Disiloxanes of the present invention include cyanomethylpentamethyldisiloxane, cyanomethyldimethyltriethyldisiloxane, bis-(cyanomethyl)-tetramethyldisiloxane, β-cyanoethylpentaethyldisiloxane, ω-cyanopropylpentapropyldisiloxane, etc.

Linear and cyclic organopolysiloxanes within the scope of the present invention contain the siloxane unit (3)
$$\left[\begin{array}{c}(CH_2)_m-\overset{\overset{CN}{|}}{C}H-R\\|\\-Si-O-\\|\\R'\end{array}\right]_n$$

individually or recurring or intercondensed with siloxane units of the structure (4)
$$\left[\begin{array}{c}R'\\|\\-Si-O-\\|\\R'\end{array}\right]_p$$

where R, R' and $m$ have the meanings given above, $n$ and $p$ are integers equal to at least 1, e.g., from 1 to 100 or more.

The cyanoalkylpolysiloxane may also include units of the formula (5)
$$\underset{\underset{O}{|}}{\overset{\overset{(CH_2)_m-\overset{\overset{CN}{|}}{C}H-R}{|}}{-Si-O}}$$

where R and $m$ have the meanings above. Such trifunctional units may be intercondensed with siloxy units (3) and (4), either individually or severally with units of the latter two structures.

Siloxane units of Formula 3 include, for example, cyanomethylmethylsiloxane, cyanomethylphenylsiloxane, β-cyanoethylethylsiloxane, β-cyanopropylphenylsiloxane, etc. Siloxane units of Formula 4 include, for example, dimethylsiloxane, diethylsiloxane, methylphenylsiloxane, etc.

Cyclopolysiloxanes which include the recurring unit of Formula 3 include sym-tetracyanomethyltetramethylcyclotetrasiloxane, sym-tetracyanomethyltetraphenylcyclotetrasiloxane, octacyanomethylcyclotetrasiloxane, etc. Cyclopolysiloxanes containing the unit of Formula 3 intercondensed with the units of Formula 4 include, for example, cyanomethylpentamethylcyclotrisiloxane, cyanoethylheptaethylcyclotetrasiloxane, cyanomethyltetramethylpentaphenylcyclopentasiloxane, cyanomethylheptamethylcyclotetrasiloxane, etc.

Siloxane units of Formula 5 include cyanoethylsiloxane, cyanopropylsiloxane, etc. Cyanoalkylpolysiloxanes composed of units (4) and (5), (3) and (5), and (3), (4) and (5) are also included within the term "cyanoalkylpolysiloxane."

Liquid linear cyanoalkylpolysiloxanes useful in the practice of the present invention include those containing a plurality of siloxane units of Formula 3 condensed alone to form oils containing one or two silicon-bonded cyanoalkyl radicals per silicon and often containing terminal triorganosiloxy, e.g., trimethylsiloxy units. Also included are liquid, linear cyanoalkylpolysiloxanes containing the siloxane units of both Formulas 3 and 4. By controlling the proportions of the two types of siloxane units, the ratio of cyanoalkyl radicals to silicon may vary within any desired limits. Thus, oils may be formed containing from two cyanoalkyl radicals per silicon atom to one cyanoalkyl radical per 100 or more silicon atoms. The linear cyanoalkylpolysiloxane may contain typical terminal groups such as the trimethylsiloxy, triethylsiloxy, triphenylsiloxy, etc., radicals.

One type of cyanoalkylpolysiloxane which can be employed as a modifying agent for the convertible organopolysiloxane may be considered as being composed of units of the formula (6)
$$(R')_x\left[-(CH_2)_m-\overset{\overset{CN}{|}}{C}H-R\right]_y SiO_{\frac{4-(x+y)}{2}}$$

where R, R' and $m$ have the meanings above, X is a whole number equal to from 0 to 2, and $y$ is a whole number equal to from 1 to 3, the sum of $x+y$ is less than 4.

Copolymers may also be employed within the practice of the instant invention in which from 0.1 to 99.9 mol percent of the siloxane unit (6) and from 0.1 to 99.9 mol percent of the siloxane units are of the formula (7)
$$R'_z SiO_{\frac{4-z}{2}}$$

where R' has the meaning given above and $z$ has an average value of from 1 to 3, inclusive. It will, therefore, be apparent that there may be present in the cyanoalkylpolysiloxane, organosiloxy units free of cyanoalkyl radicals as, for instance, recurring units of Formula 4, units of the formula (8) 

and units of the formula (9)                      $(R')_3Si-O-$ where R' has the meaning given above.

The cyanoalkyl organopolysiloxanes of the present invention may be prepared from chlorinated organopolysiloxane compounds which are well known in the art. Many of these chlorinated organopolysiloxane compounds and their methods of preparation are described in the following patents: 2,435,148—McGregor et al; 2,439,669—Nordlander; 2,444,858—Speier; 2,457,539—Elliott et al.; 2,491,833—Sauer; 2,507,316—McGregor et al.; 2,507,519—Goodwin, Jr.; 2,510,148—Speier; 2,513,924—Elliott et al.; 2,522,053—McGregor et al.; 2,589,446—Sommer. The chloroalkyl organosilicon compounds which may be used as starting materials in the present invention all contain the

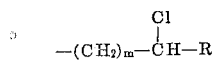

are as defined above. The Grignard reagent of these chloroalkyl compounds is prepared in the usual fashion and added dropwise to a solution of cyanogen in diethyl ether. The Grignard addition of cyanogen to the polysiloxane takes place without the addition of any heat. Since cyanogen boils below −20° C., it is preferable to carry out the Grignard addition at temperatures below the point. Suitable temperatures for the reaction are from about 50° C. to about 0° C. The ratio of cyanogen to chloroalkyl radicals may vary within wide limits, e.g., from about 0.25 mol to 3.0 mols cyanogen per mol of cyanoalkyl radicals. However, we prefer to use about one mole of cyanogen per mol of chloroalkyl radical.

Additional methods for preparing the cyanoalkylpolysiloxanes, which may be in the form of oils, rubbers, resins, etc., are found disclosed and claimed in the co-pending application of Maurice Prober and Glen D. Cooper, Serial No. 401,701, filed December 31, 1953, and assigned to the same assignee as the present invention. By reference, this Prober and Cooper application is made a part of the disclosures of the instant application.

It is only necessary to mechanicaly mix the cyanoalkylpolysiloxane with the convertible organopolysiloxane in the desired proportions, incorporate fillers (for instance, silica aerogel, fume silica, precipitated silica, finely divided diatomaceous earth, etc.) in the mixture of ingredients together with any one of the known curing or vulcanizing agents for the convertible organopolysiloxane, and heat the mixture of ingredients at temperatures ranging from about 125° to 200° C. If molding is required, molding pressures of the order of from about 500 to 1000 p.s.i. or more for times of from about 5 to 30 minutes or more, depending on the application involved, may be employed. It will be found that the physical properties after this initial molding cycle will be greatly improved as a result of the incorporation of the cyanoalkylpolysiloxane. It may be desirable in many instances, in order to bring out the optimum properties of the molded product, to subject the latter to further heat treatment usually outside the mold at elevated temperatures of the order of about 150° to 300° C. for from 1 to 24 hours or more.

In order that those skilled in the art may better understand how the present invention may be practiced, the following examples are given by way of illustration and not by way of limitation. All parts are by weight.

In the following examples, several cyanoalkylpolysiloxanes were employed. One cyanoalkylpolysiloxane fluid was prepared by blending together 230 grams cyanoethyltrichlorosilane, 464 grams dimethyldichlorosilane, 138 grams of trimethylchlorosilane and about 1500 ml. ethyl acetate, hydrolyzing the silane blend with an excess of water, washing the organic layer until essentially neutral, stripping the solvent and low boilers, and heating the mixture with 2 percent of 85 percent sulfuric acid in order to effect equilibration to introduce the chain stopping trimethylsiloxy units, neutralizing the reaction product with sodium bicarbonate and devolatilizing the reaction product at a temperature of about 200° C. at 25 mm. so as to remove all volatiles boiling up to that point. This cyanoalkylpolysiloxane will hereinafter be referred to as "cyanoethylpolysiloxane No. 1."

Another cyanoalkylpolysiloxane identified as "cyanoethylpolysiloxane No. 2" was prepared by cohydrolyzing a mixture of 60 mol percent dimethyldichlorosilane and 40 mol percent cyanoethyltrichlorosilane in ethyl acetate similarly as above. The cohydrolysis product was washed and the ethyl acetate removed to give a polymer composed of dimethylsiloxy units and cyanoethylsiloxy units $(CNCH_2CH_2SiO_{3/2})$.

An organopolysiloxane was prepared by copolymerizing 0.23 part tetramethyltetravinylcyclotetrasiloxane, 15 parts octaphenylcyclotetrasiloxane, 100 parts octamethylcyclotetrasiloxane and about 0.075 part decamethyltetrasiloxane with a small amount, for instance, about 0.001 percent KOH, based on the weight of the siloxanes, at a temperature of from about 145° to 175° C. for about 6 hours until a highly viscous benzene-soluble convertible methyl phenyl vinylpolysiloxane was obtained. This convertible methyl phenyl vinylpolysiloxane was then devolatilized to remove any low boilers. This composition will hereinafter be referred to as "convertible methyl phenylpolysiloxane."

Another convertible organopolysiloxane was prepared by heating octamethylcyclotetrasiloxane and tetramethyltetravinylcyclotetrasiloxane with about 0.001 percent KOH for from 4 to 5 hours at a temperature of 140° to 150° C. similarly as above, and the product devolatilized to yield a highly viscous product, containing about 0.2 mol percent silicon-bonded vinyl groups. This composition was identified as "convertible methylpolysiloxane."

EXAMPLE 1

A mixture of ingredients was prepared composed of the following ingredients in the stipulated parts by weight:

| Ingredient: | Parts |
|---|---|
| Convertible methylpolysiloxane | 100 |
| Fume silica | 55 |
| Diphenylsilanediol (as structure-reducing additive) | 8 |
| Bis-(2,4-dichlorobenzoyl) peroxide as a 50% solids dispersion in a methyl silicone oil | 1 |
| Cyanoalkylpolysiloxane No. 1 | 6 |

This mixture of ingredients, as well as a mixture from which cyanoalkylpolysiloxane No. 1 was omitted, were molded for 15 minutes at 150° C. at a pressure of about 500 p.s.i. and thereafter heat-aged first for one hour at 150° C., then for 24 hours at 250° C., and thereafter further heat-aged for 96 hours at 250° C., each of the heat treatments being conducted in an air-circulating oven. The following Table I shows the properties of the two formulations after the various heat treatments.

Table I

| | Sample Number | |
|---|---|---|
| | 1 [a] | 2 [b] |
| Cured 1 hr./150° C.: | | |
| Tensile, p.s.i. | 901 | 1,191 |
| Elongation, percent | 200 | 410 |
| Tear, pounds/inch | 53 | 110 |
| Cured 24 hrs./250° C.: | | |
| Tensile, p.s.i. | 746 | 745 |
| Elongation, percent | 200 | 240 |
| Tear, pounds/inch | 47 | 60 |
| Cured 96 hrs./250° C.: | | |
| Tensile, p.s.i. | 696 | 720 |
| Elongation, percent | 170 | 210 |
| Tear, pounds/inch | 41 | 68 |

[a] Contained no cyanoalkylpolysiloxane.
[b] Contained 6 parts of cyanoalkylpolysiloxane No. 1.

EXAMPLE 2

In this example, the convertible methyl phenylpolysiloxane described above was mixed with fume silica, diphenylsilanediol and bis-(2,4-dichlorobenzoyl) peroxide and thereafter to this mixture of ingredients were added the various cyanoalkylpolysiloxanes described above in varying amounts. A control was also prepared which contained no cyanoalkylpolysiloxane. The following Table II shows the various proportions of ingredients as well as the properties of the cured products molded and heat-treated similarly as in Example 1. Cyanoethylpolysiloxane No. 1 was used in Sample Nos. 4 to 7, and cyanoethylpolysiloxane No. 2 was used in Sample Nos. 8 and 9.

Table II

| | Sample Number [a] | | | | | | |
|---|---|---|---|---|---|---|---|
| | 3 | 4 | 5 | 6 | 7 | 8 | 9 |
| Convertible methyl phenylpolysiloxane | 100 | 100 | 100 | 100 | 100 | 100 | 100 |
| Fume silica | 40 | 40 | 40 | 40 | 40 | 40 | 40 |
| Diphenylsilanediol [b] | 8 | 8 | 8 | 8 | 8 | 8 | 8 |
| Bis-(2,4-dichlorobenzoyl) peroxide [c] | 1 | 1 | 1 | 1 | 1 | 1 | 1 |
| Cyanoethylpolysiloxane | 0 | 6 | 4 | 6 | 8 | 4 | 8 |
| Cured 1 hr./150° C.: | | | | | | | |
| Tensile, p.s.i. | 1,675 | 1,800 | 1,780 | 1,585 | 1,720 | 1,710 | 1,875 |
| Elongation, percent | 695 | 860 | 830 | 940 | 960 | 790 | 900 |
| Tear strength, lbs./in | 240 | 305 | 300 | 310 | 270 | 280 | 285 |
| Cured 24 hrs./250° C.: | | | | | | | |
| Tensile, p.s.i. | 525 | 560 | 640 | 730 | 610 | 630 | 820 |
| Elongation, percent | 205 | 230 | 230 | 310 | 280 | 270 | 340 |
| Tear strength, lbs./in | 80 | 105 | 85 | 75 | 95 | 105 | 125 |

[a] All values in formulation section are in parts by weight.
[b] Structure reducing additive.
[c] As a 50% weight dispersion in a methylpolysiloxane fluid.

It will, of course, be apparent to those skilled in the art that other fillers may be employed, as well as other curing agents and convertible organopolysiloxanes in addition to those described in the above-identified examples. The amount of curing agent which is used may obviously be varied widely as has been recited previously.

The amount of filler used may also be varied within wide limits and may range, for instance, from about 10 to 300% of the weight of the convertible organopolysiloxane. The actual amount of filler will depend upon such factors as the type of filler, the convertible organopolysiloxane, the application for which the cured product is intended, the proportion of the cyanoalkylpolysiloxane, etc. A range which is advantageously employed on a weight basis is from 0.2 to 3 parts of filler per part of convertible organopolysiloxane.

Obviously, other convertible organopolysiloxanes, in addition to the convertible organopolysiloxanes described in the foregoing examples may be employed in combination with minor proportions of the cyanoalkylpolysiloxane. Many examples of these convertible organopolysiloxanes, which preferably comprise convertible hydrocarbon-substituted polysiloxane in which the hydrocarbon radicals (e.g., alkyl aryl, alkaryl, aralkyl, alkenyl, etc., radicals), are attached to silicon by carbon-silicon linkages, have been described previously and find additional basis in the patents recited above. The presence of copolymerized monocyclic arylsiloxanes, for example, copolymerized diphenylsiloxane or copolymerized methyl phenyl siloxane, in addition to the polydialkylsiloxane, for instance, polydimethylsiloxane, imparts improved low temperature flexibility to the cured silicone rubber products.

The cured, solid, elastic organopolysiloxanes prepared in accordance with the present invention are capable of withstanding elevated temperatures (150° C. to 250° C.) for extended periods of time without undesirable reduction in the properties of the cured products. The same materials also retain their desirable rubbery properties at temperatures as low as −60° C. The high temperature resistance and especially the improved tear strength of these materials make them admirably suitable as insulation materials for electrical conductors, as gasket materials (for instance, in jet airplane applications, etc.), shock absorbers, and for various applications where other natural or synthetic rubbers have heretofore been employed where it is desired to take advantage of the high temperature resistance and the low temperature flexibility of the claimed organopolysiloxanes.

The compositions herein described are useful as valve seats, for instance, in connection with hot water or other heated liquid safety valves, because of their outstanding temperature resistance and freedom from sticking after long periods of use at the elevated temperatures, as well as because of their increased tensile strength and tear resistance.

What we claim as new and desire to secure by Letters Patent of the United States is:

1. A composition of matter comprising a mixture of (1) an organopolysiloxane convertible to the cured, solid, elastic state in which the organic groups are selected from the class consisting of monovalent hydrocarbon radicals and halogenated aryl radicals, there being present from 1.98 to 2.1 organic groups per silicon atom, (2) from 1 to 20%, by weight, based on the weight of (1), of a liquid organopolysiloxane containing at least one cyanoalkyl radical having the formula

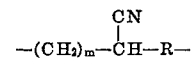

attached to silicon, where R is a member selected from the class consisting of hydrogen and lower alkyl radicals, and $m$ is a whole number equal to from 0 to 5, inclusive, the remaining valences of the silicon, other than the valences which make up the siloxane chain, being satisfied by a member selected from the class consisting of alkyl radicals, aryl radicals, aralkyl radicals, alkaryl radicals and mixtures of said radicals, and (3) a finely divided silica filler.

2. A composition of matter comprising a mixture of (1) an organopolysiloxane convertible to the cured, solid, elastic state in which the organic groups are selected from the class consisting of monovalent hydrocarbon radicals and halogenated aryl radicals, there being present from 1.98 to 2.1 organic groups per silicon atom, (2) from 1 to 20%, by weight, based on the weight of (1), of a liquid organopolysiloxane containing at least one cyanoalkyl radical having the formula

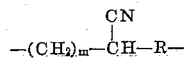

attached to silicon, where R is a member selected from the class consisting of hydrogen and lower alkyl radicals, and $m$ is a whole number equal to from 0 to 5, inclusive, the remaining valences of the silicon, other than the valences which make up the siloxane chain, being satisfied by a member selected from the class consisting of alkyl radicals, aryl radicals, aralkyl radicals, alkaryl radicals and mixtures of said radicals, (3) a finely divided silica filler, and (4) a curing agent for (1).

3. The cured composition of claim 1.

4. A composition of matter comprising a mixture of (1) a methylpolysiloxane convertible to the cured, solid, elastic state, there being present from 1.98 to 2.1 methyl groups per silicon atom, (2) from 1 to 20%, by weight, based on the weight of (1), of a liquid organopolysiloxane containing at least one cyanoalkyl radical having the formula

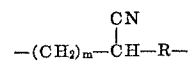

attached to silicon, where R is a member selected from the class consisting of hydrogen and lower alkyl radicals, and $m$ is a whole number having a value of from 0 to 5, inclusive, the remaining valences of the silicon, other than the valences which make up the siloxane chain, being satisfied by a member selected from the class consisting of alkyl radicals, aryl radicals, aralkyl radicals, alkaryl radicals and mixtures of said radicals and (3) a finely divided silica filler.

5. A composition of matter comprising a mixture of (1) a methyl phenylpolysiloxane convertible to the cured, solid, elastic state, there being present from 1.98 to 2.1 total methyl and phenyl groups per silicon atom, (2) from 1 to 20%, by weight, based on the weight of (1), of a liquid organopolysiloxane containing at least one cyanoalkyl radical having the formula

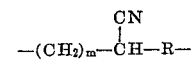

attached to silicon, where R is a member selected from the class consisting of hydrogen and lower alkyl radicals, and $m$ is a whole number equal to from 0 to 5, inclusive, the remaining valences of the silicon, other than the valences which make up the siloxane chain, being satisfied by a member selected from the class consisting of alkyl radicals, aryl radicals, aralkyl radicals, alkaryl radicals and mixtures of said radicals and (3) a finely divided silica filler.

6. A composition of matter comprising a mixture of (1) a methyl vinylpolysiloxane convertible to the cured, solid, elastic state, there being present from 1.98 to 2.1 total methyl and vinyl groups per silicon atom, (2) from 1 to 20%, by weight, based on the weight of (1) of a liquid cyanoalkylpolysiloxane containing at least one cyanoalkyl radical having the formula

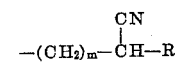

attached to silicon, where R is a member selected from the class consisting of hydrogen and lower alkyl radicals, and $m$ is a whole number equal to from 0 to 5, inclusive, the remaining valences of silicon, other than the valences which make up the siloxane chain, being satisfied by members selected from the class consisting of alkyl radicals, aryl radicals, aralkyl radicals, alkaryl radicals, and mixtures of said radicals, (3) a finely divided filler and (4) a curing agent for (1).

7. The cured composition of claim 6.

8. A composition of matter comprising a mixture of (1) a methyl phenyl vinylpolysiloxane convertible to the cured, solid, elastic state in which there are present from 1.98 to 2.1 total methyl, phenyl, and vinyl groups per silicon atom, (2) from 1 to 20%, by weight, based on the weight of (1) of a liquid cyanoalkylpolysiloxane containing at least one cyanoalkyl radical having the formula

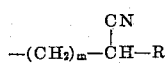

attached to silicon, where R is a member selected from the class consisting of hydrogen and lower alkyl radicals, and $m$ is a whole number equal to from 0 to 5, inclusive, the remaining valences of silicon, other than the valences which make up the siloxane chain, being satisfied by members selected from the class consisting of alkyl radicals, aryl radicals, aralkyl radicals, alkaryl radicals and mixtures of said radicals, (3) a finely divided filler and (4) a curing agent for (1).

9. The cured composition of claim 8.

10. A composition as in claim 6 in which the cyanoalkyl radical is a cyanoethyl radical.

11. A composition as in claim 8 in which the cyanoalkyl radical is a cyanoethyl radical.

12. A composition of matter comprising a mixture of (1) a methyl vinylpolysiloxane convertible to the cured, solid, elastic state, there being present from 1.98 to 2.1 total methyl and vinyl groups per silicon atom, (2) from 1 to 20%, by weight, based on the weight of (1) of a liquid cyanoethylpolysiloxane containing at least one silicon bonded cyanoethyl radical with the remaining valences of silicon, other than valences which make up the siloxane chain, being satisfied by members selected from the class consisting of alkyl radicals, aryl radicals, aralkyl radicals, alkaryl radicals, and mixtures of said radicals, (3) a finely divided silica filler and (4) bis-(2,4-dichlorobenzoyl) peroxide.

13. The cured composition of claim 12.

14. A composition of matter comprising a mixture of (1) a methyl phenyl vinylpolysiloxane convertible to the cured, solid, elastic state in which there are present from 1.98 to 2.1 total methyl, phenyl, and vinyl groups per silicon atom, (2) from 1 to 20%, by weight, based on the weight of (1) of a liquid cyanoethylpolysiloxane containing at least one silicon bonded cyanoethyl radical with any remaining valences of silicon, other than the valences which make up the siloxane chain, being satisfied by members selected from the class consisting of alkyl radicals, aryl radicals, aralkyl radicals, alkaryl radicals, and mixtures of said radicals, (3) a finely divided silica filler and (4) bis-(2,4-dichlorobenzoyl) peroxide.

15. The cured composition of claim 14.

16. The process for obtaining improved, cured, solid, elastic organopolysiloxanes in which the organic groups are selected from the class consisting of monovalent hydrocarbon radicals and halogenated aryl radicals, there being present from 1.98 to 2.1 organic groups per silicon atom, which process comprises (1) mixing into the aforesaid organopolysiloxane (a) from 1 to 20%, by weight thereof of a liquid organopolysiloxane containing at least one cyanoalkyl radical having the formula

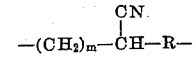

attached to silicon, where R is a member selected from the class consisting of hydrogen and lower alkyl radicals, and $m$ is a whole number equal to from 0 to 5, inclusive, the remaining valences of the silicon, other than the valences which make up the siloxane chain, being satisfied by a member selected from the class consisting of alkyl radicals, aryl radicals, aralkyl radicals, alkaryl radicals and mixtures of said radicals, there being present from 1 to 3 organic groups per silicon atom in the cyanoalkyl radical-containing organopolysiloxanes, (b) a filler, and (c) a curing agent for the organopolysiloxane, and (2) thereafter heating the mixture of ingredients at elevated temperatures to effect a cure of the filled organopolysiloxane.

17. The process as in claim 16 in which the organopolysiloxane convertible to the cured, solid, elastic state is a methyl vinylpolysiloxane containing from 1.98 to 2.1 total methyl and vinyl groups per silicon atom and the cyanoalkyl radical is a cyanoethyl radical.

18. The process as in claim 16 in which the organopolysiloxane convertible to the cured, solid, elastic state is a methyl phenyl vinylpolysiloxane containing from 1.98 to 2.1 total methyl, phenyl, and vinyl groups per silicon atom and the cyanoalkyl radical is a cyanoethyl radical.

References Cited in the file of this patent

UNITED STATES PATENTS

| | | |
|---|---|---|
| 2,442,196 | Coggeshall | May 25, 1948 |
| 2,776,306 | Cole | Jan. 1, 1957 |
| 2,819,236 | Dickmann | Jan. 7, 1958 |
| 2,860,083 | Nitzsche et al. | Nov. 11, 1958 |
| 2,890,188 | Konkle | June 9, 1959 |

FOREIGN PATENTS

| | | |
|---|---|---|
| 1,116,725 | France | Feb. 6, 1956 |